No. 802,898. PATENTED OCT. 24, 1905.
R. O. WILCOX.
COMBINED SHAFT SUPPORT AND HOLDBACK.
APPLICATION FILED MAR. 13, 1905.
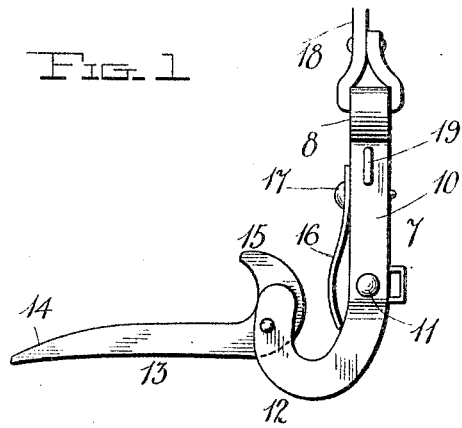
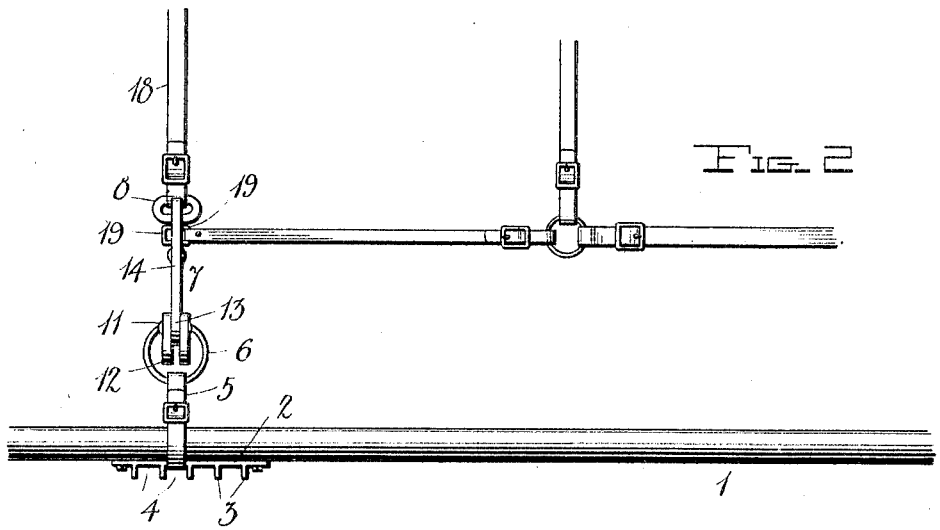
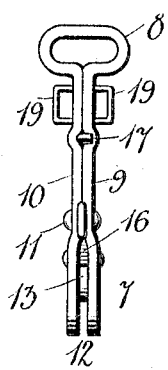
Witnesses
Inventor
R. O. Wilcox
by H. B. Wilson
Attorney

UNITED STATES PATENT OFFICE.

REUBEN O. WILCOX, OF WINFIELD, KANSAS.

COMBINED SHAFT-SUPPORT AND HOLDBACK.

No. 802,898.      Specification of Letters Patent.      Patented Oct. 24, 1905.

Application filed March 13, 1905. Serial No. 249,836.

*To all whom it may concern:*

Be it known that I, REUBEN O. WILCOX, a citizen of the United States, residing at Winfield, in the county of Cowley and State of Kansas, have invented certain new and useful Improvements in a Combined Shaft-Support and Holdback; and I do declare the following to be a full, clear, and exact description of the invention, such as will enable others skilled in the art to which it appertains to make and use the same.

This invention relates to combined shaft-supports and holdbacks; and one of the objects of the same is to provide simple and convenient means for supporting the shafts of a vehicle and providing means for connecting the holdback to said shaft-supporting means.

Another object is to provide a device of this character which shall be simple in construction, which will not require buckling and unbuckling, and which can be quickly attached and detached from the vehicle and horse.

These and other objects are attained by means of the construction illustrated in the accompanying drawings, in which—

Figure 1 is a side elevation of my combined shaft-support and holdback. Fig. 2 is a front elevation of the same connected to a broken-away portion of a vehicle-shaft, and Fig. 3 is a rear elevation of the same.

Referring to the drawings for a more particular description of my invention, the numeral 1 designates the vehicle-shaft, having upon its under side a metal plate 2, provided with a series of projecting lugs 3 and intermediate recesses 4. Surrounding the shaft and passing between a pair of the lugs 3 is a strap 5, said strap being adapted to be adjusted in any one of the recesses 4, depending upon the size or length of the horse to be connected to the vehicle. A ring 6 is engaged in the bight of the strap 5, and to this ring the hook 7 is connected to support the shaft. The hook 7 is made from a flat sheet-metal blank, doubled upon itself to provide the upper supporting-loop 8, and the two members 9 10 being riveted together at 11, and the bill 12 of the hook comprising the two spaced members, between which a hooked lever 13 is pivoted, said lever consisting of a handle 14 and a nose 15, which bears against a spring 16 when closed or in engaging position. The spring 16 is secured to the shank of the hook 7 by means of a rivet 17. The loop 8 at the top of the hook 7 is connected to the harness-saddle by means of a strap 18. Extending laterally from the sides of each member 9 and 10 is a loop 19, one of said loops being connected to a holdback-strap which extends to the breeching of the harness. By forming a loop 19 upon each side of the hook 7 the latter may be used upon either side of the horse, and hence said hooks can be made in duplicate or of identical construction.

The operation of my invention will be understood from the foregoing without a more extended description.

Various changes in the form, proportion, and the minor details of construction may be resorted to without departing from the principle or sacrificing any of the advantages of this invention.

Having thus described my invention, what I claim as new, and desire to secure by Letters Patent, is—

In a device of the character described, a hook made from a flat sheet-metal blank and comprising the two spaced members having a loop at the upper end, a loop at each side thereof, the spaced bill members, the lever pivoted between said members, and a spring secured to the shank of the hook to bear against the lever to hold it in engaging position, substantially as described.

In testimony whereof I have hereunto set my hand in presence of two subscribing witnesses.

REUBEN O. WILCOX.

Witnesses:
    W. D. KREAMER,
    C. W. BAILEY.